US007479198B2

(12) United States Patent
Guffrey et al.

(10) Patent No.: US 7,479,198 B2
(45) Date of Patent: Jan. 20, 2009

(54) METHODS FOR FORMING NANOFIBER ADHESIVE STRUCTURES

(75) Inventors: Erik Guffrey, Ft. Myers, FL (US); Gerrad S. Allison, Angier, NC (US)

(73) Assignee: Timothy D'Annunzio, Raeford, NC (US), part interest ( * ) Notice: Subject to any disclaimer, the term of this patent is extended or adjusted under 35 U.S.C. 154(b) by 489 days.

(21) Appl. No.: 11/399,708

(22) Filed: Apr. 6, 2006

(65) Prior Publication Data

US 2006/0237126 A1    Oct. 26, 2006

Related U.S. Application Data

(60) Provisional application No. 60/669,156, filed on Apr. 7, 2005.

(51) Int. Cl.
  *B32B 37/22* (2006.01)
  *B32B 38/10* (2006.01)
  *B08B 3/08* (2006.01)
  *D01F 8/00* (2006.01)

(52) U.S. Cl. .................. 156/155; 156/249; 156/250; 156/265; 156/299; 156/344; 134/26; 428/373; 428/397

(58) Field of Classification Search .............. 156/61, 156/155, 166, 249, 250, 265, 297, 299, 344; 134/26; 428/373, 374, 397; 977/720, 724, 977/734, 753, 902, 961, 962
  See application file for complete search history.

(56) References Cited

U.S. PATENT DOCUMENTS 6,861,142 B1 *  3/2005  Wilkie et al. ............... 428/373
6,872,439 B2 *  3/2005  Fearing et al. ............... 428/99
7,132,161 B2 * 11/2006  Knowles et al. ............ 428/364
2002/0100581 A1  8/2002  Knowles et al. ............ 165/185
2003/0124312 A1 *  7/2003  Autumn ...................... 428/141
2003/0208888 A1 11/2003  Fearing et al. ............... 24/442
2004/0071870 A1  4/2004  Knowles et al. ............ 427/200
2005/0132543 A1  6/2005  Lindsay et al. .............. 24/442
2005/0148984 A1 *  7/2005  Lindsay et al. ............. 604/387
2005/0181170 A1  8/2005  Fearing et al. ............... 428/85
2006/0005362 A1  1/2006  Arzt et al. .................... 24/442

OTHER PUBLICATIONS

Autumn et al., "Evidence for van der Waals adhesion in gecko setae," Proceedings of the National Academy of Sciences, vol. 99, No. 19, pp. 12252-12256, Sep. 17, 2002.
Autumn, Kellar, "Welcome to the Autumn Lab," 6 pages, <http://www.lclark.edu/~autumn/dept/>.

(Continued)

*Primary Examiner*—Philip C Tucker
*Assistant Examiner*—Christopher C Caillouet
(74) *Attorney, Agent, or Firm*—Heslin Rothenberg Farley & Mesiti, P.C.

(57) ABSTRACT

A method for forming a nanofiber adhesive structure includes, in one embodiment, providing a plurality of generally parallel fiber bundles secured in a first binder and in which each of the fiber bundles includes a plurality of generally parallel fibers secured in a second binder. The fibers have a diameter between about 200 nanometers to about 400 nanometers. A portion of the first binder is dissolved from the structure to expose end portions of the plurality of fiber bundles having a length of about 100 microns. A portion of the second binder of the exposed end portions of the plurality of fiber bundle is dissolved to expose the fibers having a length of about 15 microns. Thin slices may be made and assembled on a web to provide a gecko tape having adhesive properties based on Van der Waals forces.

32 Claims, 4 Drawing Sheets

OTHER PUBLICATIONS

Autumn et al., "Adhesive Force of a Single Gecko Foot-hair." Nature, vol. 405, pp. 681-684, Jun. 8, 2000.

McDonagh, Sorcha, "Caught on Tape: Gecko-inspired adhesive is superstrong," Science News Online, vol. 163, No. 23, 3 pages, Jun. 7, 2003, <http://www.sciencenews.org/articles/20030607/fob3.asp>.

Brown, Irene, "Researchers Creating Gecko Glue," Animal Planet News, 2 pages, 2002, <http://animal.discovery.com/news/briefs/200208/geckoglue.html>.

Roach, John. "Will 'Gecko Tape' Let Humans Climb Walls?" National Geographic News, 4 pages, Jun. 2, 2003, <http://news.nationalgeographic.com/news/2003/06/0602_030602_geckotape.html>.

Graham-Rowe, Duncan, "Synthetic Gecko Hairs Promise Walking Up Walls," New Scientist.com, 2 pages, May 2003, <http://www.newscientist.com/news/news.jsp?id=ns99993726>.

* cited by examiner

METHODS FOR FORMING NANOFIBER ADHESIVE STRUCTURES

CROSS-REFERENCE TO RELATED APPLICATION

This application claims the benefit of pending U.S. Provisional Application No. 60/669,156, filed on Apr. 7, 2005, entitled "Gecko Adhesion Technology," the entire subject matter of which is incorporated herein by reference.

FIELD OF THE INVENTION

This invention relates to adhesives, and more particularly to nanofiber adhesives structures where attachment is via Van der Waals forces.

BACKGROUND OF THE INVENTION

It has been observed that the pad of a gecko's foot is comprised of hundreds of thousands of setae. Setae are small hairs that split into hundreds of much smaller hairs called spatula. It was hypothesized and eventually proven that the adhesive force of the gecko was due these tiny hairs. The spatula of the gecko ranges about 200 nanometers to about 400 nanometers in diameter. It was determined that the adhesive force of the gecko was to due to intermolecular forces caused by the individual spatula. These forces, commonly known as Van der Waals forces, are weak attractive forces between atoms or non-polar molecules caused by a temporary change in dipole moment arising from a brief shift in orbital electrons to one side of one atom or molecule, creating a similar shift in adjacent atoms or molecules. Although Van der Waals forces are relatively weak, the spatula are so small and so many in number that the aggregate force is very strong.

Attempts at forming an adhesive microstructure based on the configuration of the gecko's foot includes forming a plurality of setae-like members having a plurality of spatulae-like protrusions by nanomolding using a template, polymer self-assembly, lithography, and etching.

There is a need for further methods for forming nanofiber adhesives structures where attachment is via Van der Waals forces.

SUMMARY OF THE INVENTION

The present invention provides, in a first aspect, a method for forming a nanofiber adhesive structure in which the method includes providing a structure comprising a plurality of fiber bundles in a first binder, and in which the plurality of fiber bundles comprises a plurality of fibers in a second binder. A portion of the first binder is dissolved from the structure to expose end portions of the plurality of fiber bundles having a first length. A portion of the second binder is dissolved from the structure to expose end portions of the plurality of fibers having a second length. The first binder is generally insoluble by the second solvent and the second binder is generally insoluble by the first solvent.

The present invention provides, in a second aspect, a method for forming a nanofiber adhesive structure in which the method includes forming a plurality of parallel fiber bundles and a first binder into a structure in which the plurality of fiber bundles comprises a plurality of fibers in a second binder. The structure is cut across the fiber bundles, the first binder, and the second binder. A portion of the first binder is dissolved from the structure to expose end portions of the plurality of fiber bundles having a first length, and a portion of the second binder is dissolved from the structure to expose end portions of the plurality of fibers having a second length. The second length is less than the first length, and the first binder is generally insoluble by the second solvent and the second binder is generally insoluble by the first solvent.

The present invention provides, in a third aspect, a method for forming a nanofiber adhesive structure in which the method includes providing a structure comprising a plurality of generally parallel fiber bundles in a first binder, and in which the fiber bundle comprises a plurality of generally parallel fibers in a second binder. The plurality of fibers comprises a diameter less than about 400 nanometers. A portion of the first binder is dissolved from the structure to expose end portions of the plurality of fiber bundles having a first length of about 100 microns, and a portion of the second binder is dissolved from the structure to expose end portions of the plurality of fibers having a second length of about 15 microns. The first binder is generally insoluble by the second solvent and the second binder is generally insoluble by the first solvent.

BRIEF DESCRIPTION OF THE DRAWINGS

The present matter which is regarded as the invention is particularly pointed out and distinctly claimed in the concluding portion of the specification. The present invention, however, may best be understood by reference to the following detailed description of various embodiments and the accompanying drawings in which:

DETAILED DESCRIPTION OF THE INVENTION

The present invention is directed to adhesive nanofiber structures that may, for example, allow microrobots to climb walls and walk across ceilings through the use of synthetic nanofibers and Van der Waals forces. Other uses of the adhesive nanofiber structures are in the releasable attachment of one item to another to another.

Figure 1:
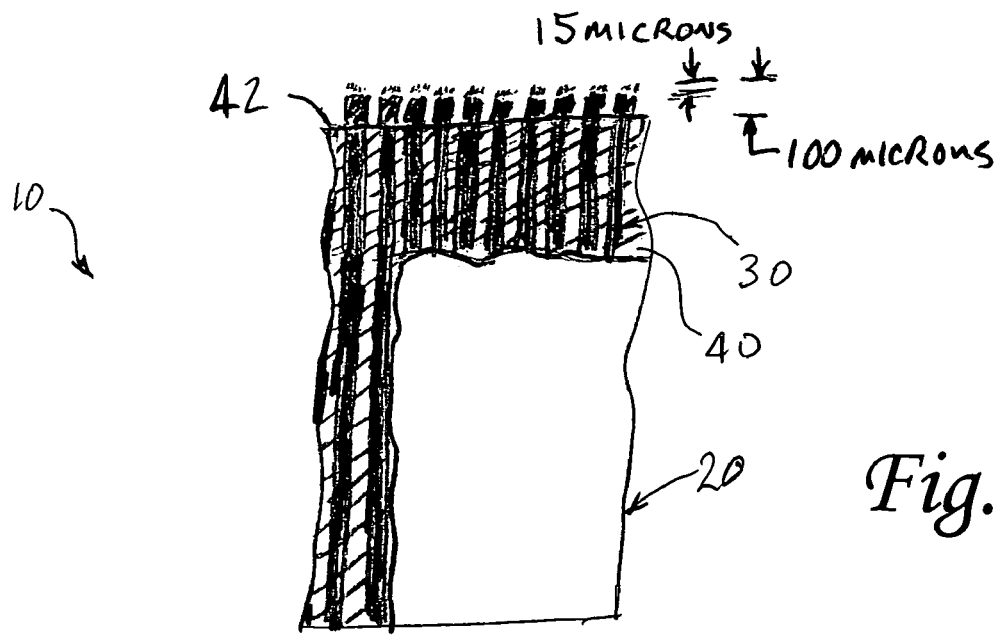
FIG. 1 is an enlarged, partial cross-sectional view of a portion of an adhesive nanofiber structure in accordance with the present invention.
Figure 2:
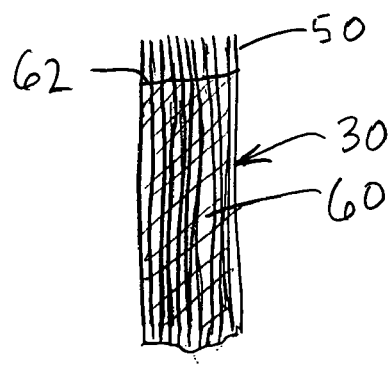
FIG. 2 is an enlarged, partial cross-sectional view of one of the fiber bundles of FIG. 1.

FIG. 1 illustrates an enlarged, partial cross-sectional view of a portion of an adhesive nanofiber structure 10 in accordance with the present invention. Adhesive nanofiber structure 10 generally includes a structure 20 comprising a plurality of fiber bundles 30 disposed in a first binder 40. As best shown in FIG. 2, each of the plurality of fiber bundles 30 includes a plurality of fibers 50 disposed in a second binder 60. As described in greater detail below, the first binder is different from the second binder to allow adhesive nanofiber structure 10 to be readily and inexpensively formed. In addition, the stiffness of the first binder may be different than the stiffness of the second stiffness.

With reference again to FIG. 1, structure 20 may be about 1 millimeter thick. Fiber bundles 30 may extend through the thickness of structure 20. In addition, fiber bundle 30 may have a diameter of about 2 to about 5 microns and extend about 100 microns from an upper surface 42 defined by first binder 40. Desirably, the fiber bundles and fibers extend normal to the plane of the surface of the structure. Fiber bundle 30 may include between 800 and 1,200 individual fibers 50. Fibers 50 may extend along the length of fiber bundle 30. Fibers 50 such as nanofibers may have a diameter of less than about 400 nanometers and may extend 15 microns from an upper surface 62 defined by second binder 60 as best shown in FIG. 2. For example, the diameter of the nanofibers may have a diameter between 200 nanometers and 400 nanometers.

The unsupported exposed portions of the fiber bundle act as the setae of the gecko feet and the unsupported exposed portions of the fibers act the spatulae of the gecko feet. The tensile property of the fiber desirably matches, or exceeds that of the adhesive force produced. It is also desirable that the fibers used have hydrophobic properties like the Keratin that makes up the setae of the gecko, as further described below.

Figure 3:
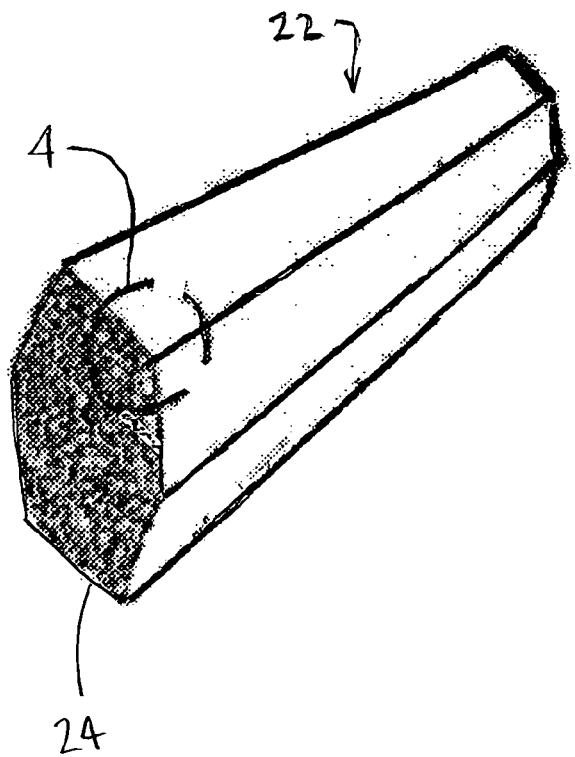
FIG. 3 is a perspective view of a generally rigid rod from which the adhesive nanofiber structure of FIG. 1 may be formed in accordance with the present invention.

FIG. 3 illustrates one embodiment of a generally rigid rod 22 from which adhesive nanofiber structure 10 may be formed in accordance with the present invention. Illustrated rod 22 may have a hexagonal cross-section. However, it will be appreciated that the other cross-sectional configurations such as square, rectangular, round, triangular, and other shapes, may be suitably employed as well. The length of the rigid rod may be tens of millimeters long or longer to allow for ease of processing, as described below.

The process for forming rod 22 is best described in connection with FIGS. 3-5. Initially, as shown in FIG. 5, a plurality of parallel fibers 50 such as nanofibers are axially aligned and secured in second binder 60 to form a fiber bundle 30.

Figure 4:
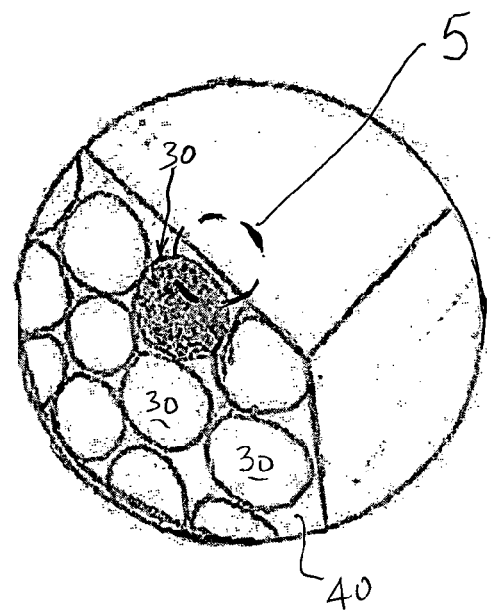
FIG. 4 is an enlarged view of detail 4 of FIG. 3.
Figure 5:
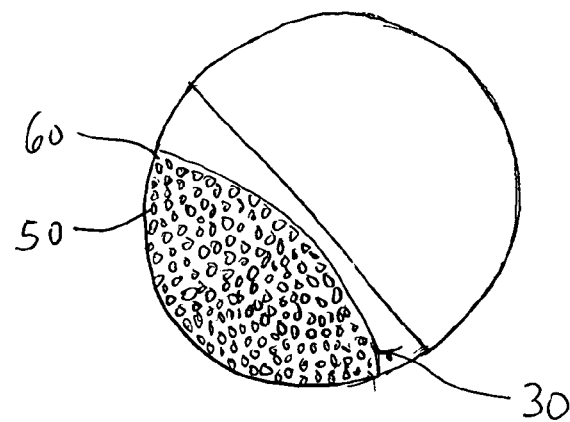
FIG. 5 is an enlarged view of detail 5 of FIG. 4.

As shown in FIG. 4, a plurality of fiber bundles 30 is then assembled and saturated with first binder 40 to form rigid rod 22. The first binder holds together the fiber bundles for ease of handling as described below. The fibers and the fiber bundles may extend the length of the rod.

Figure 6:
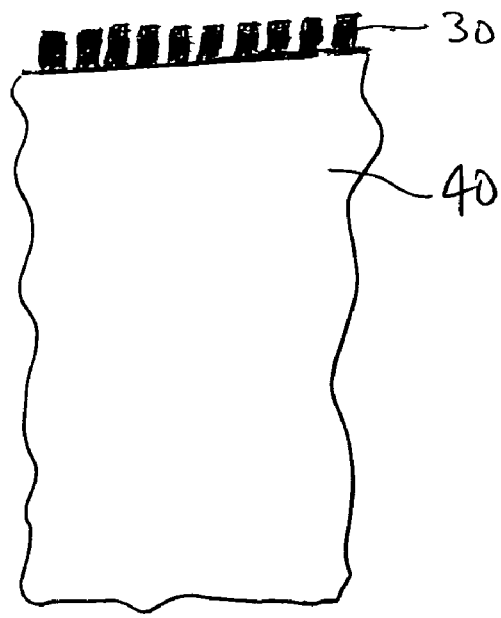
FIG. 6 is an enlarged elevational view of a cut end of the rod of FIG. 3 in which a portion of the first binder has been removed.

Once the fiber bundles are in a rod form or otherwise organized, an end 24 (FIG. 3) of rod 22 (FIG. 3) is cut normal to the length of the fibers to provide a smooth surface exposing the fibers, the first binder, and the second binder. Next, as best shown in FIG. 6, a portion of first binder 40 is removed from the cut end to expose an end portion of the plurality of fiber bundles 30, for example, to a depth of about 100 microns. This can be achieved by applying a first solvent to remove the first binder or dipping the end of a rod in the first solvent. The first solvent is desirably selected so as to not dissolve the second binder of the fiber bundle as well as not harm the individual fibers.

Figure 7:
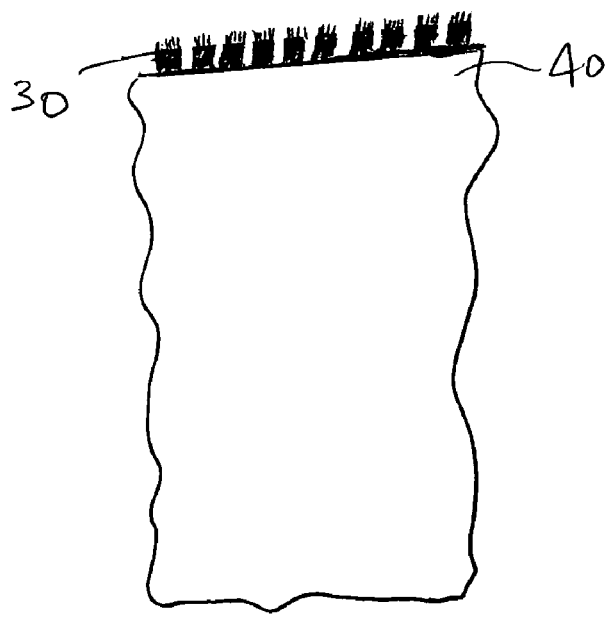
FIG. 7 is an elevational view of the end of the rod of FIG. 6 in which a portion of the second binder has been removed to expose the plurality of fibers.

Next, as shown in FIG. 7, second binder 60 (FIG. 5) of the exposed portions of the plurality of fiber bundles 30 is dissolved with a second solvent to a desired depth. This can be achieved by applying a second solvent to remove the second binder or dipping the ends of the exposed portions of the plurality of fiber bundles in the second solvent. The second binder of the exposed fiber bundle ends may be removed to a depth less than the depth of the exposed fiber bundles. For example, the second binder may be dissolved to expose the end portions of the fibers having a length of about 15 microns.

The second solvent is desirably selected so as to not dissolve the first binder of the rod as well as not harm the individual fibers.

The dissolving of the binders may be dependent on the total time the binders are exposed to the solvents. After the solvent is applied and the fiber bundles or fibers are exposed to the desired depth, the solvent may be removed and the fiber bundle or fibers may be rinsed to remove any remaining solvents.

Hills, Inc. of West Melbourne, Fla., a developer of machinery and technology for the synthetic fiber industry has developed an "islands-in-the-sea" process for the production of "islands-in-the-sea" (INS) fibers (i.e., fiber bundles) using a standard spinning process. Polypropylene, polyester and nylon have been used for the island polymer (i.e., fibers), with a dissolvable polymer used as the sea polymer (i.e., binder). INS fibers having 600 islands (i.e., fibers) having diameters of approximately 300 nanometers have been formed. INS fibers having 900 islands, 1,200 islands, and 3,000 islands, and more, have also been formed. U.S. Pat. No. 6,861,142 issued to Wilkie, et al. and assigned to Hills, Inc. further describes the "islands-in-the-sea" process and fiber, and is incorporated herein in its entirety by reference.

Suitable INS fibers may include polypropylene islands (i.e., fibers) and polyvinyl alcohol (PVA) sea (i.e., binder) which is soluble in water heated to an elevated temperature 80 degrees Celsius. Other suitable INS fibers may include polyester islands (i.e., fiber) and polyvinyl alcohol (PVA) sea (i.e., binder) which is soluble in water at an elevated temperature of 80 degrees Celsius.

Other exemplary non-dissolvable fibers may include polyesters such as polyethylene terephthalate (PET), polyethylene naphthalate (PEN), polytrimethylene terephthalate (PTT) and polybutylene terephthalate (PBT); polyurethanes; polycarbonates; polyamides such as Nylon 6, Nylon 6,6 and Nylon 6,10; polyolefins such as polyethylene and polypropylene; and combinations thereof.

Other exemplary dissolvable binders for the fiber bundle may include polystyrene (soluble in organic solvents); water-soluble vinyl acetate resins; polyethylene terephthalate modified with a sulfonated isocyanate and commonly referred to as easy soluble polyester or ESPET (soluble in sodium hydroxide).

Where the fiber bundle is formed from polypropylene fibers and a polyvinyl alcohol (PVA) binder, the binder for forming the rod may be an acetate based compound which is dissolvable in acetone. Where the fiber bundle is formed from polyester fibers and polyvinyl alcohol (PVA) binder, the binder for forming the rod may be an acetate based compound which is dissolvable in acetone. It will be appreciated that other suitable binders and solvents may be employed.

Another embodiment for processing the end of rod 22 may include initially dissolving the second binder from the fiber bundles to a desired depth, and then dissolving the first binder from the rod to a desired depth. It will be appreciated that the while the removal of the desired portions of the binders may be selected to approximate the dimensions of the setae and spatula of the gecko, it will be appreciated that other dimensions of the thickness of the structure, dimensions of the fiber bundles and fibers, and the lengths of the exposed portions of the fiber bundles and fibers may be suitably employed to provide adhesive nanofiber structures. In addition, the portions of the binders may be removed by means other than dissolving. For example, one or more of the binders may be removed by thermal or heat treatment processes, removed by mechanical processes, or removed by other suitable processes.

Figure 8:
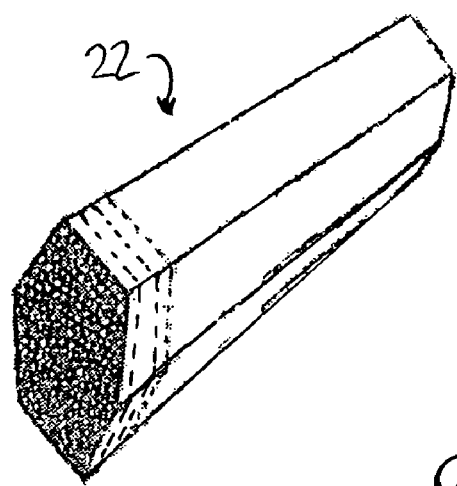
FIG. 8 is a perspective view of the rod of FIG. 3 from which a plurality of slices may be made.
Figure 9:
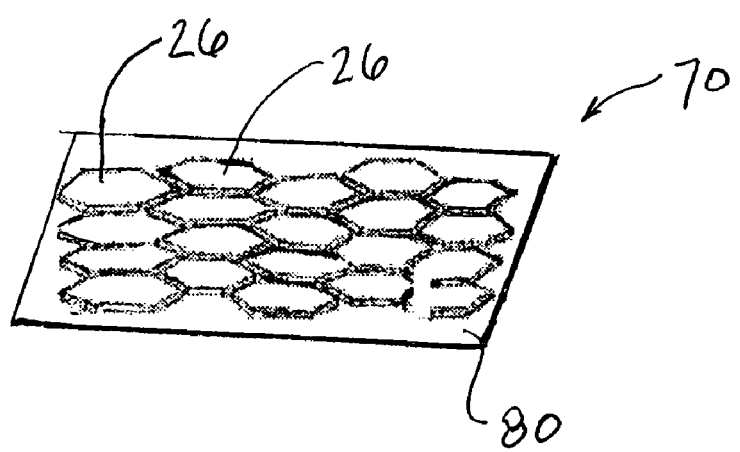
FIG. 9 is a perspective view of a nanofiber adhesive structure tape formed from a plurality of slices from the rod of FIG. 8.

FIGS. 8 and 9 illustrates the process for forming a nanofiber adhesive structure tape 70 or synthetic "gecko tape." In one embodiment, rod 22 is formed and processed as described above to expose the plurality of fiber bundles and fibers. Then, about a 1 mm slice of the end of rod 22 with the exposed fibers is made. After cutting the slice, the two-step dissolving process is repeated to generate additional slices. A plurality of slices 26 may then be arranged and suitably secured to a web 80 such as a flexible fabric, or to other suitable rigid or flexible substrates. The slices can be secured to the web or other substrate using an adhesive.

Alternatively, another process for forming a nanofiber adhesive structure tape may include forming the rod as described above. Once the rod is formed, a plurality of slices may cut from the rod. The thickness of the slices may be approximately 1 millimeter thick, enough to give the plates structure and allow for flexibility. The plurality of slices may then be adjacently arranged and suitably secured to a substrate or web. The fibers may then be exposed by removing the proper amount of the binders as described above. As noted above, the slices may have any suitable cross-sectional configuration.

Although various embodiments have been depicted and described in detail herein, it will be apparent to those skilled in the relevant art that modifications, additions, substitutions and the like can be made without departing from the spirit of the present invention and these are, therefore, considered to be within the scope of the present invention as defined in the following claims.

The invention claimed is:

1. A method for forming a nanofiber adhesive structure, the method comprising:
    providing a structure comprising a plurality of fiber bundles in a first binder, the plurality of fiber bundles comprising a plurality of fibers in a second binder;
    dissolving a portion of the first binder from the structure to expose end portions of the plurality of fiber bundles having a first length using a first solvent;
    dissolving a portion of the second binder from the structure to expose end portions of the plurality of fibers having a second length using a second solvent; and
    wherein the first binder is generally insoluble by the second solvent and the second binder is generally insoluble by the first solvent.

2. The method of claim 1 wherein the second length is less than the first length.

3. The method of claim 1 wherein the dissolving the portion of the second binder comprises dissolving the portion of the second binder from the exposed end portions of the plurality of fiber bundles.

4. The method of claim 1 wherein the plurality of fiber bundles and the plurality of fibers have a generally parallel orientation.

5. The method of claim 1 further comprising cutting the structure to provide a slice, repeating the steps of dissolving the first and second binders and cutting the structure to provide a plurality of slices, and assembling the plurality of slices on a web.

6. The method of claim 1 wherein the providing the structure comprises providing the structure having a thickness of about 1 millimeter.

7. The method of claim 1 further comprising cutting the structure to provide a slice having a thickness of about 1 millimeter.

8. The method of claim 1 wherein the fibers have a diameter less than about 400 nanometers.

9. The method of claim 1 wherein the dissolving the portion of the first binder comprises dissolving the portion of the first binder from the structure to expose end portions of the plurality of fiber bundles having a length of about 100 microns, and the dissolving the portion of the second binder comprises dissolving a portion of the second binder from the structure to expose end portions of the plurality of fibers having a length of about 15 microns.

10. The method of claim 1 wherein the plurality of fiber bundles comprise between about 900 and about 1,200 fibers.

11. The method of claim 1 wherein the first binder comprises a first stiffness and the second binder comprises a second stiffness and wherein the first stiffness is different from the second stiffness.

12. The method of claim 1 wherein the structure comprises a hexagonal cross-section.

13. A method for forming a nanofiber adhesive structure, the method comprising:
    forming a plurality of parallel fiber bundles and a first binder into a structure, the plurality of fiber bundles comprising a plurality of fibers in a second binder;
    cutting the structure across the fiber bundles, the first binder, and the second binder;
    dissolving a portion of the first binder from the structure to expose end portions of the plurality of fiber bundles having a first length using a first solvent; and
    dissolving a portion of the second binder from the structure to expose end portions of the plurality of fibers having a second length using a second solvent; and
    wherein the second length being less than the first length, and the first binder is generally insoluble by the second solvent and the second binder is generally insoluble by the first solvent.

14. The method of claim 13 wherein the dissolving the portion of the second binder comprises dissolving the portion of the second binder from the exposed end portions of the plurality of fiber bundles.

15. The method of claim 13 further comprising cutting the structure to provide a slice, repeating the steps of dissolving the first and second binders and cutting the structure to provide a plurality of slices, and assembling the plurality of slices on a web.

16. The method of claim 13 wherein the providing the structure comprises providing the structure having a thickness of about 1 millimeter.

17. The method of claim 13 further comprising cutting the structure to provide a slice having a thickness of about 1 millimeter.

18. The method of claim 13 wherein the fibers have a diameter less than about 400 nanometers.

19. The method of claim 13 wherein the dissolving the portion of the first binder comprises dissolving the portion of the first binder from the structure to expose end portions of the plurality of fiber bundles having a length of about 100 microns, and the dissolving the portion of the second binder comprises dissolving a portion of the second binder from the structure to expose end portions of the plurality of fibers having a length of about 15 microns.

20. The method of claim 13 wherein the plurality of fiber bundles comprise between about 900 and about 1,200 fibers.

21. The method of claim 13 wherein the first binder comprises a first stiffness and the second binder comprises a second stiffness and wherein the first stiffness is different from the second stiffness.

22. The method of claim 13 wherein the structure comprises a hexagonal cross-section.

23. A method for forming a nanofiber adhesive structure, the method comprising:
   providing a structure comprising a plurality of generally parallel fiber bundles in a first binder, the fiber bundle comprising a plurality of generally parallel fibers in a second binder, and the plurality of fibers comprising a diameter less than about 400 nanometers;
   dissolving a portion of the first binder from the structure to expose end portions of the plurality of fiber bundles having a first length using a first solvent of about 100 microns;
   dissolving a portion of the second binder from the structure to expose end portions of the plurality of fibers having a second length using a second solvent of about 15 microns; and
   wherein the first binder is generally insoluble by the second solvent and the second binder is generally insoluble by the first solvent.

24. The method of claim 23 wherein the dissolving the portion of the second binder comprises dissolving the portion of the second binder from the exposed end portions of the plurality of fiber bundles.

25. The method of claim 23 wherein the providing the structure comprises forming the plurality of fiber bundles in the first binder.

26. The method of claim 23 further comprising cutting the structure across the plurality of fiber bundles, the first binder, and the second binder.

27. The method of claim 23 further comprising cutting the structure to provide a slice, repeating the steps of dissolving the first and second binders and cutting the structure to provide a plurality of slices, and assembling the plurality of slices on a web.

28. The method of claim 23 wherein the providing the structure comprises providing the structure having a thickness of about 1 millimeter.

29. The method of claim 23 further comprising cutting the structure to provide a slice having a thickness of about 1 millimeter.

30. The method of claim 23 wherein the plurality of fiber bundles comprise between about 900 and about 1,200 fibers.

31. The method of claim 23 wherein the first binder comprises a first stiffness and the second binder comprises a second stiffness and wherein the first stiffness is different from the second stiffness.

32. The method of claim 23 wherein the structure comprises a hexagonal cross-section.

* * * * *